United States Patent
Wilson et al.

(10) Patent No.: US 12,399,304 B2
(45) Date of Patent: Aug. 26, 2025

(54) STACK OF STERILE PEELABLE LENSES WITH LOW CREEP

(71) Applicant: Laminated Film LLC, Las Vegas, NV (US)

(72) Inventors: Stephen S. Wilson, Las Vegas, NV (US); Bart E. Wilson, Las Vegas, NV (US); Roger Cone, Las Vegas, NV (US)

(73) Assignee: Laminated Film LLC, Las Vegas, NV (US)

( * ) Notice: Subject to any disclaimer, the term of this patent is extended or adjusted under 35 U.S.C. 154(b) by 10 days.

(21) Appl. No.: 18/442,824

(22) Filed: Feb. 15, 2024

(65) Prior Publication Data

US 2024/0319410 A1    Sep. 26, 2024

Related U.S. Application Data

(63) Continuation of application No. 17/823,413, filed on Aug. 30, 2022, now Pat. No. 11,933,943.

(60) Provisional application No. 63/365,909, filed on Jun. 6, 2022.

(51) Int. Cl.
   *G02B 1/14* (2015.01)
   *G02B 3/00* (2006.01)

(52) U.S. Cl.
   CPC .............. *G02B 1/14* (2015.01); *G02B 3/0062* (2013.01)

(58) Field of Classification Search
   CPC ............ G02B 3/0068; B32B 7/12; B32B 7/06
   See application file for complete search history.

(56) References Cited

U.S. PATENT DOCUMENTS

| | | | |
|---|---|---|---|
| 1,337,036 A | 4/1920 | Bergmann |
| 1,366,907 A | 2/1921 | Dunand |
| 2,138,086 A | 11/1938 | Blodjer |
| 2,248,331 A | 7/1941 | Blodjer |

(Continued)

FOREIGN PATENT DOCUMENTS

| | | |
|---|---|---|
| AU | 2005244595 A1 | 7/2006 |
| AU | 2015277196 A1 | 1/2017 |

(Continued)

OTHER PUBLICATIONS

*Racing Optics, Inc.* v. *Aevoe Corp. Dba Moshi*; Case 2:15-cv-01774-RCJ-VCF; "Answer to Aevoe's Counterclaims—Jury Trial Demanded"; Nov. 2, 2015; 15 pages.

(Continued)

*Primary Examiner* — Alex A Rolland
(74) *Attorney, Agent, or Firm* — Stetina Garred Brucker & Newboles

(57) ABSTRACT

A method of manufacturing a sterile stack of peelable lenses includes coating a first lens (or stack of lenses) with a first adhesive coating, heating the first adhesive coating to initiate curing, exposing the first adhesive coating to ultraviolet light to continue curing, laminating a second lens (or stack of lenses) onto a surface of the first adhesive coating to produce a stack of lenses, coating the second lens with a second adhesive coating, heating the second adhesive coating to initiate curing, exposing the second adhesive coating to ultraviolet light to continue curing, laminating a third lens (or stack of lenses) onto a surface of the second adhesive coating to add the third lens to the stack of lenses, and exposing the stack of lenses to an electron beam to continue curing of the first and second adhesive coatings.

21 Claims, 1 Drawing Sheet

(56) References Cited

U.S. PATENT DOCUMENTS

| | | |
|---|---|---|
| 2,328,687 A | 9/1943 | Serr |
| 2,339,280 A | 1/1944 | Madson |
| 2,354,415 A | 7/1944 | Woodard |
| 2,461,604 A | 2/1949 | Huntsman |
| 2,511,329 A | 6/1950 | Craig |
| 2,546,117 A | 3/1951 | Whelan |
| 2,563,125 A | 8/1951 | Malcom, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,095,575 A | 7/1963 | Radov |
| 3,298,031 A | 1/1967 | Morgan |
| 3,475,766 A | 11/1969 | Raschke |
| 3,577,565 A | 5/1971 | Feldmann et al. |
| 3,605,115 A | 9/1971 | Bohner |
| 3,685,054 A | 8/1972 | Raschke |
| 3,774,239 A | 11/1973 | Kotzar |
| 3,785,102 A | 1/1974 | Amos |
| 3,797,042 A | 3/1974 | Gager |
| 3,810,815 A | 5/1974 | Welhart et al. |
| 3,868,293 A | 2/1975 | Selph |
| 3,937,863 A | 2/1976 | Moore |
| 3,948,662 A | 4/1976 | Alston et al. |
| 3,950,580 A | 4/1976 | Boudet |
| 3,987,569 A | 10/1976 | Chase |
| 4,063,740 A | 12/1977 | Mader |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,332,861 A | 6/1982 | Franz et al. |
| 4,333,983 A | 6/1982 | Allen |
| 4,380,563 A | 4/1983 | Ayotte |
| 4,528,701 A | 7/1985 | Smith |
| 4,557,980 A | 12/1985 | Hodnett, III |
| 4,582,764 A | 4/1986 | Allerd et al. |
| 4,625,341 A | 12/1986 | Broersma |
| 4,658,515 A | 4/1987 | Oatman |
| 4,696,860 A | 9/1987 | Epperson |
| 4,701,965 A | 10/1987 | Landis |
| 4,716,601 A | 1/1988 | Mcneal |
| 4,726,074 A | 2/1988 | Baclit et al. |
| 4,729,179 A | 3/1988 | Quist, Jr. |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,856,535 A | 8/1989 | Forbes |
| 4,864,653 A | 9/1989 | Landis |
| 4,867,178 A | 9/1989 | Smith |
| 4,884,296 A | 12/1989 | Nix, Jr. |
| 4,884,302 A | 12/1989 | Foehl |
| 4,889,754 A | 12/1989 | Vargas |
| D306,363 S | 2/1990 | Stackhouse et al. |
| 4,907,090 A | 3/1990 | Ananian |
| 4,911,964 A | 3/1990 | Corbo |
| D307,065 S | 4/1990 | Friedman |
| 4,920,576 A | 5/1990 | Landis |
| 4,934,792 A | 6/1990 | Tovi |
| 4,945,573 A | 8/1990 | Landis |
| 4,950,445 A | 8/1990 | Salce et al. |
| D311,263 S | 10/1990 | Russell |
| 4,964,171 A | 10/1990 | Landis |
| 4,965,887 A | 10/1990 | Paoluccio et al. |
| 4,973,511 A | 11/1990 | Farmer et al. |
| 4,975,981 A | 12/1990 | Ray |
| 5,000,528 A | 3/1991 | Kawakatsu |
| 5,002,326 A | 3/1991 | Spicer et al. |
| D318,147 S | 7/1991 | Russell |
| 5,035,004 A | 7/1991 | Koester |
| D319,449 S | 8/1991 | Millar |
| 5,046,195 A | 9/1991 | Koritan |
| D321,268 S | 10/1991 | Nix, Jr. |
| 5,052,054 A | 10/1991 | Birum |
| 5,054,480 A | 10/1991 | Bare et al. |
| 5,067,475 A | 11/1991 | Posnansky |
| 5,071,206 A | 12/1991 | Hood et al. |
| H1023 H | 3/1992 | Wiseman |
| 5,104,929 A | 4/1992 | Bilkadi |
| 5,113,528 A | 5/1992 | Burke, Jr. et al. |
| D331,820 S | 12/1992 | Scanlon |
| D333,366 S | 2/1993 | Brown |
| 5,183,700 A | 2/1993 | Austin |
| 5,194,293 A | 3/1993 | Foster |
| 5,201,077 A | 4/1993 | Dondlinger |
| 5,206,956 A | 5/1993 | Olson |
| 5,208,916 A | 5/1993 | Kelman |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| 5,327,180 A | 7/1994 | Hester, III et al. |
| D349,362 S | 8/1994 | Russell |
| 5,364,671 A | 11/1994 | Gustafson |
| 5,365,615 A | 11/1994 | Piszkin |
| D353,691 S | 12/1994 | Scanlon |
| D354,588 S | 1/1995 | Russell |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,468,247 A | 11/1995 | Matthai et al. |
| 5,471,036 A | 11/1995 | Sperbeck |
| 5,473,778 A | 12/1995 | Bell |
| 5,486,883 A | 1/1996 | Candido |
| 5,507,332 A | 4/1996 | Mckinnon |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,553,608 A | 9/1996 | Reese et al. |
| 5,555,570 A | 9/1996 | Bay |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |
| 5,633,049 A | 5/1997 | Bilkadi et al. |
| 5,668,612 A | 9/1997 | Hung |
| 5,671,483 A | 9/1997 | Reuber |
| 5,673,431 A | 10/1997 | Batty |
| 5,687,420 A | 11/1997 | Chong |
| 5,694,650 A | 12/1997 | Hong |
| 5,702,415 A | 12/1997 | Matthai et al. |
| 5,709,825 A | 1/1998 | Shih |
| 5,740,560 A | 4/1998 | Muoio |
| 5,792,535 A | 8/1998 | Weder |
| 5,806,102 A | 9/1998 | Park |
| 5,815,848 A | 10/1998 | Jarvis |
| 5,819,311 A | 10/1998 | Lo |
| 5,846,659 A | 12/1998 | Hartmut et al. |
| D404,849 S | 1/1999 | Desy |
| 5,885,704 A | 3/1999 | Peiffer et al. |
| 5,896,991 A | 4/1999 | Hippely et al. |
| 5,924,129 A | 7/1999 | Gill |
| 5,937,596 A | 8/1999 | Leeuwenburgh et al. |
| 5,956,175 A | 9/1999 | Hojnowski |
| 5,972,453 A | 10/1999 | Akiwa et al. |
| 5,991,072 A | 11/1999 | Solyntjes et al. |

(56) References Cited

U.S. PATENT DOCUMENTS

| | | |
|---|---|---|
| 5,991,081 A | 11/1999 | Haaland et al. |
| 5,991,930 A | 11/1999 | Sorrentino |
| D418,256 S | 12/1999 | Caruana |
| 6,008,299 A | 12/1999 | Mcgrath et al. |
| 6,049,419 A | 4/2000 | Wheatley et al. |
| 6,085,358 A | 7/2000 | Cogan |
| 6,173,447 B1 | 1/2001 | Arnold |
| 6,217,099 B1 | 4/2001 | Mckinney et al. |
| 6,221,112 B1 | 4/2001 | Snider |
| 6,237,147 B1 | 5/2001 | Brockman |
| 6,250,765 B1 | 6/2001 | Murakami |
| 6,305,073 B1 | 10/2001 | Badders |
| 6,347,401 B1 | 2/2002 | Joyce |
| 6,375,865 B1 | 4/2002 | Paulson et al. |
| 6,378,133 B1 | 4/2002 | Daikuzono |
| 6,381,750 B1 | 5/2002 | Mangan |
| 6,385,776 B2 | 5/2002 | Linday |
| 6,388,813 B1 | 5/2002 | Wilson et al. |
| 6,403,005 B1 | 6/2002 | Mientus et al. |
| 6,416,872 B1 | 7/2002 | Maschwitz |
| 6,432,522 B1 | 8/2002 | Friedman et al. |
| 6,461,709 B1 | 10/2002 | Janssen et al. |
| 6,469,752 B1 | 10/2002 | Ishikawa et al. |
| 6,481,019 B2 | 11/2002 | Diaz et al. |
| 6,491,390 B1 | 12/2002 | Provost |
| 6,531,180 B1 | 3/2003 | Takushima et al. |
| 6,536,045 B1 | 3/2003 | Wilson et al. |
| 6,536,589 B2 | 3/2003 | Chang |
| 6,555,235 B1 | 4/2003 | Aufderheide et al. |
| 6,559,902 B1 | 5/2003 | Kusuda et al. |
| 6,576,349 B2 | 6/2003 | Lingle et al. |
| 6,584,614 B2 | 7/2003 | Hogg |
| 6,592,950 B1 | 7/2003 | Toshima et al. |
| 6,614,423 B1 | 9/2003 | Wong et al. |
| 6,622,311 B2 | 9/2003 | Diaz et al. |
| D480,838 S | 10/2003 | Martin |
| 6,654,071 B2 | 11/2003 | Chen |
| 6,660,389 B2 | 12/2003 | Liu et al. |
| 6,662,371 B2 | 12/2003 | Shin |
| 6,667,738 B2 | 12/2003 | Murphy |
| 6,739,718 B1 | 5/2004 | Jung |
| 6,745,396 B1 | 6/2004 | Landis et al. |
| 6,750,922 B1 | 6/2004 | Benning |
| 6,773,778 B2 | 8/2004 | Onozawa et al. |
| 6,773,816 B2 | 8/2004 | Tsutsumi |
| 6,777,055 B2 | 8/2004 | Janssen et al. |
| 6,800,378 B2 | 10/2004 | Hawa et al. |
| 6,838,610 B2 | 1/2005 | de Moraes |
| 6,841,190 B2 | 1/2005 | Liu et al. |
| 6,847,492 B2 | 1/2005 | Wilson et al. |
| 6,864,882 B2 | 3/2005 | Newton |
| 6,870,686 B2 | 3/2005 | Wilson et al. |
| 6,879,319 B2 | 4/2005 | Cok |
| 6,907,617 B2 | 6/2005 | Johnson |
| 6,911,593 B2 | 6/2005 | Mazumder et al. |
| 6,922,850 B1 | 8/2005 | Arnold |
| 6,952,950 B2 | 10/2005 | Doe et al. |
| 6,967,044 B1 | 11/2005 | O'Brien |
| D512,797 S | 12/2005 | Canavan et al. |
| 6,973,677 B2 | 12/2005 | Diaz et al. |
| 6,995,976 B2 | 2/2006 | Richardson |
| 7,070,837 B2 | 7/2006 | Ross |
| 7,071,927 B2 | 7/2006 | Blanchard |
| D526,446 S | 8/2006 | Cowan et al. |
| 7,097,080 B2 | 8/2006 | Cox |
| 7,101,810 B2 | 9/2006 | Bond et al. |
| 7,103,920 B1 | 9/2006 | Otterson |
| 7,143,979 B2 | 12/2006 | Wood et al. |
| 7,184,217 B2 | 2/2007 | Wilson et al. |
| D541,991 S | 5/2007 | Lawrence |
| 7,215,473 B2 | 5/2007 | Fleming |
| 7,226,176 B1 | 6/2007 | Huang |
| 7,238,401 B1 | 7/2007 | Dietz |
| 7,311,956 B2 | 12/2007 | Pitzen |
| D559,442 S | 1/2008 | Regelbrugge et al. |
| 7,344,241 B2 | 3/2008 | Baek |
| 7,351,470 B2 | 4/2008 | Draheim et al. |
| D569,557 S | 5/2008 | Cho |
| 7,389,869 B2 | 6/2008 | Mason, Jr. |
| 7,410,684 B2 | 8/2008 | Mccormick |
| 7,425,369 B2 | 9/2008 | Oakey et al. |
| D586,052 S | 2/2009 | Elias |
| 7,495,895 B2 | 2/2009 | Carnevali |
| 7,597,441 B1 | 10/2009 | Farwig |
| 7,629,052 B2 | 12/2009 | Brumwell |
| 7,631,365 B2 | 12/2009 | Mahan |
| 7,663,047 B2 | 2/2010 | Hanuschak |
| 7,709,095 B2 | 5/2010 | Persoone et al. |
| 7,722,921 B2 | 5/2010 | Shimoda et al. |
| 7,727,615 B2 | 6/2010 | Kato et al. |
| 7,735,156 B2 | 6/2010 | VanDerWoude et al. |
| 7,752,682 B2 | 7/2010 | Vanderwoude et al. |
| 7,812,077 B2 | 10/2010 | Borade et al. |
| 7,858,001 B2 | 12/2010 | Qin et al. |
| 7,937,775 B2 | 5/2011 | Manzella, Jr. et al. |
| 7,957,524 B2 | 6/2011 | Chipping |
| 8,024,818 B1 | 9/2011 | Davenport |
| 8,044,942 B1 | 10/2011 | Leonhard et al. |
| 8,101,277 B2 | 1/2012 | Logan et al. |
| 8,234,722 B2 | 8/2012 | VanDerWoude et al. |
| 8,261,375 B1 | 9/2012 | Reaux |
| 8,282,234 B2 | 10/2012 | VanDerWoude et al. |
| 8,292,347 B1 | 10/2012 | Drake |
| 8,294,843 B2 | 10/2012 | Hollaway |
| 8,316,470 B2 | 11/2012 | McNeal et al. |
| 8,361,260 B2 | 1/2013 | Wilson et al. |
| 8,407,818 B2 | 4/2013 | VanDerWoude et al. |
| D683,077 S | 5/2013 | Klotz et al. |
| 8,455,105 B2 | 6/2013 | Hobeika et al. |
| D692,187 S | 10/2013 | Isobe |
| D692,189 S | 10/2013 | Isobe |
| 8,567,596 B1 | 10/2013 | Mason, Jr. |
| 8,693,102 B2 | 4/2014 | Wilson et al. |
| 8,819,869 B2 | 9/2014 | VanDerWoude et al. |
| 8,889,801 B2 | 11/2014 | Liao et al. |
| 8,918,198 B2 | 12/2014 | Atanasoff |
| 8,974,620 B2 | 3/2015 | Wilson et al. |
| D726,378 S | 4/2015 | Wako |
| 8,999,509 B2 | 4/2015 | Port et al. |
| 9,023,162 B2 | 5/2015 | Mccormick et al. |
| 9,104,256 B2 | 8/2015 | Wilson et al. |
| 9,128,545 B2 | 9/2015 | Wilson et al. |
| 9,150,763 B2 | 10/2015 | Lopez et al. |
| 9,161,858 B2 | 10/2015 | Capers et al. |
| 9,170,415 B2 | 10/2015 | Mansuy |
| 9,173,437 B2 | 11/2015 | VanDerWoude et al. |
| 9,204,823 B2 | 12/2015 | Derenne et al. |
| 9,274,625 B2 | 3/2016 | Wilson et al. |
| 9,295,297 B2 | 3/2016 | Wilson |
| D759,900 S | 6/2016 | Cummings et al. |
| 9,442,306 B1 | 9/2016 | Hines et al. |
| 9,471,163 B2 | 10/2016 | Wilson et al. |
| 9,526,290 B2 | 12/2016 | Wilson |
| 9,575,231 B2 | 2/2017 | Chu et al. |
| D781,507 S | 3/2017 | Huh |
| D781,508 S | 3/2017 | Huh |
| 9,629,407 B2 | 4/2017 | Foster |
| 9,671,622 B1 | 6/2017 | Vetrini et al. |
| 9,706,808 B2 | 7/2017 | Sclafani et al. |
| 9,726,940 B2 | 8/2017 | Tomiyasu |
| D805,256 S | 12/2017 | Yang |
| 9,905,297 B2 | 2/2018 | Best |
| D815,190 S | 4/2018 | Dellemann |
| 9,968,155 B2 | 5/2018 | Wilson |
| 10,070,678 B2 | 9/2018 | Wilson |
| 10,165,819 B2 | 1/2019 | Klotz et al. |
| 10,201,207 B2 | 2/2019 | VanDerWoude et al. |
| 10,226,095 B2 | 3/2019 | Wilson |
| 10,227,501 B2 | 3/2019 | Hwang et al. |
| D849,240 S | 5/2019 | Guo et al. |
| D850,256 S | 6/2019 | Ryszawy |
| 10,321,731 B2 | 6/2019 | Wilson |
| 10,345,934 B2 | 7/2019 | Wilson et al. |
| 10,384,084 B2 | 8/2019 | Isham et al. |

(56) References Cited

U.S. PATENT DOCUMENTS

| | | |
|---|---|---|
| 10,427,385 B2 | 10/2019 | Wilson et al. |
| 10,449,397 B2 | 10/2019 | VanDerWoude et al. |
| 10,520,756 B2 | 12/2019 | Gallina et al. |
| 10,537,236 B2 | 1/2020 | Bennett et al. |
| D879,384 S | 3/2020 | Sato |
| D882,182 S | 4/2020 | Fekete |
| 10,620,670 B2 | 4/2020 | Wilson et al. |
| 10,687,569 B1 | 6/2020 | Mcdirmid |
| 10,716,986 B2 | 7/2020 | Winter et al. |
| 10,874,163 B2 | 12/2020 | VanDerWoude et al. |
| D907,299 S | 1/2021 | Brown, II et al. |
| D907,300 S | 1/2021 | Brown, II et al. |
| D925,129 S | 7/2021 | Wilson |
| D925,834 S | 7/2021 | Babin et al. |
| 11,090,516 B2 | 8/2021 | VanDerWoude et al. |
| 11,141,959 B2 | 10/2021 | Wilson et al. |
| 11,147,323 B1 | 10/2021 | Wilson |
| 11,307,329 B1 | 4/2022 | Wilson |
| 11,480,801 B1 | 10/2022 | Morris et al. |
| 11,490,667 B1 | 11/2022 | Wilson |
| 11,510,718 B2 | 11/2022 | Childers et al. |
| 11,548,356 B2 | 1/2023 | Wilson et al. |
| 11,579,339 B2 | 2/2023 | Thothadri et al. |
| 11,709,296 B2 | 7/2023 | Wilson et al. |
| 11,723,420 B2 | 8/2023 | Wilson et al. |
| 11,807,078 B2 | 11/2023 | Wilson et al. |
| 11,988,850 B2 | 5/2024 | Wilson et al. |
| 2001/0035936 A1 | 11/2001 | Maisnik |
| 2002/0025441 A1 | 2/2002 | Hieda et al. |
| 2002/0036362 A1 | 3/2002 | Chigira et al. |
| 2002/0101411 A1 | 8/2002 | Chang |
| 2002/0109922 A1 | 8/2002 | Wilson et al. |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0139530 A1 | 7/2004 | Yan |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0015860 A1 | 1/2005 | Reaux |
| 2005/0071909 A1 | 4/2005 | Diaz et al. |
| 2005/0133035 A1 | 6/2005 | Yahiaoui et al. |
| 2005/0180877 A1 | 8/2005 | Usami et al. |
| 2005/0186415 A1 | 8/2005 | Mccormick et al. |
| 2005/0188821 A1 | 9/2005 | Yamashita et al. |
| 2005/0200154 A1 | 9/2005 | Barbee et al. |
| 2005/0249957 A1 | 11/2005 | Jing et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0056030 A1 | 3/2006 | Fukuda et al. |
| 2006/0057399 A1 | 3/2006 | Persoone et al. |
| 2006/0114245 A1 | 6/2006 | Masters et al. |
| 2006/0138694 A1 | 6/2006 | Biernath et al. |
| 2006/0158609 A1 | 7/2006 | Heil |
| 2006/0177654 A1 | 8/2006 | Shoshi |
| 2006/0204776 A1 | 9/2006 | Chen et al. |
| 2006/0254088 A1 | 11/2006 | Mccormick |
| 2006/0285218 A1 | 12/2006 | Wilson et al. |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo De Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0030675 A1 | 2/2008 | Dillon |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0176018 A1 | 7/2008 | Enniss et al. |
| 2008/0192351 A1 | 8/2008 | Miyagawa et al. |
| 2008/0231979 A1 | 9/2008 | Chen |
| 2008/0256688 A1 | 10/2008 | Bruce |
| 2008/0286500 A1 | 11/2008 | Sussner et al. |
| 2008/0292820 A1 | 11/2008 | Padiyath et al. |
| 2009/0011205 A1 | 1/2009 | Thiel |
| 2009/0026095 A1 | 1/2009 | Lofland et al. |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2009/0105437 A1 | 4/2009 | Determan et al. |
| 2009/0119819 A1 | 5/2009 | Thompson |
| 2009/0181242 A1 | 7/2009 | Enniss et al. |
| 2009/0233032 A1 | 9/2009 | Craig |
| 2009/0239045 A1 | 9/2009 | Kato et al. |
| 2009/0239048 A1 | 9/2009 | Sugihara et al. |
| 2010/0026646 A1 | 2/2010 | Xiao et al. |
| 2010/0033442 A1 | 2/2010 | Kusuda et al. |
| 2010/0102197 A1 | 4/2010 | Mcintyre |
| 2010/0102476 A1 | 4/2010 | Higgins |
| 2010/0122402 A1 | 5/2010 | Tipp |
| 2010/0146679 A1 | 6/2010 | Heil |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0097574 A1 | 4/2011 | Faldysta et al. |
| 2011/0119801 A1 | 5/2011 | Wright |
| 2011/0165361 A1 | 7/2011 | Sherman et al. |
| 2011/0168261 A1 | 7/2011 | Welser et al. |
| 2011/0267793 A1 | 11/2011 | Cohen et al. |
| 2011/0271497 A1 | 11/2011 | Suh et al. |
| 2011/0277361 A1 | 11/2011 | Nichol et al. |
| 2011/0279383 A1 | 11/2011 | Wilson et al. |
| 2012/0003431 A1 | 1/2012 | Huang |
| 2012/0030095 A1 | 2/2012 | Marshall et al. |
| 2012/0047614 A1 | 3/2012 | Choi |
| 2012/0070603 A1 | 3/2012 | Hsu |
| 2012/0081792 A1 | 4/2012 | Neuffer |
| 2012/0137414 A1 | 6/2012 | Saylor |
| 2012/0180204 A1 | 7/2012 | Hawkins |
| 2012/0183712 A1 | 7/2012 | Leonhard et al. |
| 2012/0188743 A1 | 7/2012 | Wilson et al. |
| 2012/0200816 A1 | 8/2012 | Krasnov et al. |
| 2012/0291173 A1 | 11/2012 | Gleason et al. |
| 2013/0045371 A1 | 2/2013 | O'Donnell |
| 2013/0083285 A1 | 4/2013 | McNeal et al. |
| 2013/0089688 A1 | 4/2013 | Wilson et al. |
| 2013/0098543 A1 | 4/2013 | Reuter et al. |
| 2013/0141693 A1 | 6/2013 | McCabe et al. |
| 2013/0145525 A1 | 6/2013 | Arenson et al. |
| 2013/0222913 A1 | 8/2013 | Tomoda et al. |
| 2013/0247286 A1 | 9/2013 | Vanderwoude et al. |
| 2013/0293959 A1 | 11/2013 | Mcdonald |
| 2014/0020153 A1 | 1/2014 | Romanski et al. |
| 2014/0050909 A1 | 2/2014 | Choi et al. |
| 2014/0220283 A1 | 8/2014 | Wilson et al. |
| 2014/0259321 A1 | 9/2014 | Arnold |
| 2014/0289937 A1 | 10/2014 | Capers et al. |
| 2015/0033431 A1 | 2/2015 | Hofer Kraner et al. |
| 2015/0103474 A1 | 4/2015 | Cho |
| 2015/0131047 A1 | 5/2015 | Saylor et al. |
| 2015/0202847 A1 | 7/2015 | Johnson et al. |

(56) References Cited

U.S. PATENT DOCUMENTS

| | | |
|---|---|---|
| 2015/0234209 A1 | 8/2015 | Miyamoto et al. |
| 2015/0258715 A1 | 9/2015 | Ohta |
| 2015/0294656 A1 | 10/2015 | Hanuschak |
| 2015/0309609 A1 | 10/2015 | Wilson et al. |
| 2015/0349147 A1 | 12/2015 | Xi et al. |
| 2015/0359675 A1 | 12/2015 | Wilson |
| 2016/0023442 A1 | 1/2016 | Faris |
| 2016/0050990 A1 | 2/2016 | Hayes |
| 2016/0073720 A1 | 3/2016 | Niedrich |
| 2016/0231834 A1 | 8/2016 | Hardi |
| 2016/0259102 A1 | 9/2016 | Taka |
| 2016/0271922 A1 | 9/2016 | Uzawa et al. |
| 2016/0291543 A1 | 10/2016 | Saito |
| 2016/0318227 A1 | 11/2016 | Kim et al. |
| 2017/0052286 A1 | 2/2017 | Hines et al. |
| 2017/0071792 A1 | 3/2017 | Wilson et al. |
| 2017/0079364 A1 | 3/2017 | Paulson |
| 2017/0129219 A1 | 5/2017 | Uebelacker et al. |
| 2017/0173923 A1 | 6/2017 | Davis et al. |
| 2017/0192131 A1 | 7/2017 | Wilson et al. |
| 2017/0208878 A1 | 7/2017 | Kakinuma et al. |
| 2017/0232713 A1 | 8/2017 | Mannheim Astete et al. |
| 2017/0281414 A1 | 10/2017 | Wilson |
| 2017/0299898 A1 | 10/2017 | Gallina et al. |
| 2017/0318877 A1 | 11/2017 | Yahiaoui et al. |
| 2018/0029337 A1 | 2/2018 | Wilson et al. |
| 2018/0042324 A1 | 2/2018 | King |
| 2018/0052334 A1 | 2/2018 | Repko |
| 2018/0094164 A1 | 4/2018 | Ito et al. |
| 2018/0148578 A1 | 5/2018 | Ohta et al. |
| 2018/0161208 A1 | 6/2018 | Huh |
| 2018/0229480 A1 | 8/2018 | Chung |
| 2018/0236753 A1 | 8/2018 | Wykoff, II et al. |
| 2018/0295925 A1 | 10/2018 | Gagliardo et al. |
| 2018/0338550 A1 | 11/2018 | Boulware et al. |
| 2019/0021430 A1 | 1/2019 | Elliott |
| 2019/0037948 A1 | 2/2019 | Romanski et al. |
| 2019/0116300 A1 | 4/2019 | Okuno |
| 2019/0118057 A1 | 4/2019 | Winter et al. |
| 2019/0209912 A1 | 7/2019 | Isserow et al. |
| 2019/0212474 A1 | 7/2019 | Le Quang et al. |
| 2019/0346591 A1 | 11/2019 | Thothadri et al. |
| 2019/0389182 A1 | 12/2019 | Wilson et al. |
| 2020/0100657 A1 | 4/2020 | Lee et al. |
| 2020/0115519 A1 | 4/2020 | Phillips et al. |
| 2020/0124768 A1 | 4/2020 | Wilson |
| 2020/0134773 A1 | 4/2020 | Pinter et al. |
| 2020/0154808 A1 | 5/2020 | Inouye |
| 2020/0178622 A1 | 6/2020 | Jascomb et al. |
| 2020/0247102 A1 | 8/2020 | Wilson et al. |
| 2020/0261055 A1 | 8/2020 | Zwierstra et al. |
| 2020/0281301 A1 | 9/2020 | Wynalda, Jr. |
| 2020/0310494 A1 | 10/2020 | Ahn et al. |
| 2020/0359718 A1 | 11/2020 | Jefferis et al. |
| 2020/0375272 A1 | 12/2020 | Ulmer et al. |
| 2020/0384747 A1 | 12/2020 | Fukuda et al. |
| 2021/0030095 A1 | 2/2021 | Reicher |
| 2021/0162645 A1 | 6/2021 | Wilson et al. |
| 2021/0283994 A1 | 9/2021 | Wilson |
| 2021/0298380 A1 | 9/2021 | Brown, II et al. |
| 2021/0298390 A1 | 9/2021 | Sup, IV et al. |
| 2021/0307425 A1 | 10/2021 | Keim |
| 2021/0315291 A1 | 10/2021 | Votolato et al. |
| 2021/0318553 A1 | 10/2021 | Gharabegian |
| 2021/0321692 A1 | 10/2021 | Wilson |
| 2021/0321693 A1 | 10/2021 | Wilson et al. |
| 2021/0329999 A1 | 10/2021 | Ackerman |
| 2021/0368886 A1 | 12/2021 | Swart et al. |
| 2021/0386155 A1 | 12/2021 | Rose |
| 2021/0393440 A1 | 12/2021 | Leatt et al. |
| 2021/0394427 A1 | 12/2021 | Frisco et al. |
| 2022/0015472 A1 | 1/2022 | Boza |
| 2023/0106407 A1 | 4/2023 | Arima et al. |

FOREIGN PATENT DOCUMENTS

| | | |
|---|---|---|
| CA | 2386043 A1 | 11/2003 |
| DE | 3637188 A1 | 5/1988 |
| DE | 19808535 A1 | 9/1999 |
| DE | 202004010014 U1 | 4/2005 |
| DE | 202020101562 U1 | 4/2020 |
| DE | 202020101794 U1 | 4/2020 |
| EP | 192075 A2 | 8/1986 |
| EP | 671258 A2 | 9/1995 |
| EP | 1471415 A2 | 10/2004 |
| EP | 1517791 A2 | 3/2005 |
| EP | 1047537 B1 | 3/2010 |
| EP | 3157480 A1 | 4/2017 |
| GB | 2310862 A | 9/1997 |
| GB | 2492574 A | 1/2013 |
| JP | 61017860 A | 1/1986 |
| JP | S6117860 A | 1/1986 |
| JP | 62053832 A | 3/1987 |
| JP | 04314537 A | 11/1992 |
| JP | 06143496 A | 5/1994 |
| JP | 07021456 A | 1/1995 |
| JP | 10167765 A | 6/1998 |
| JP | 2000334812 A | 12/2000 |
| JP | 2002328613 A | 11/2002 |
| JP | 2012183822 A | 9/2012 |
| JP | 2014032222 A | 2/2014 |
| JP | 2015128896 A | 7/2015 |
| JP | 2018200329 A | 12/2018 |
| JP | 6767596 B1 | 10/2020 |
| KR | 20120001292 A | 1/2012 |
| TW | 200700793 A | 1/2007 |
| TW | 201027992 A | 7/2010 |
| WO | 0024576 A1 | 5/2000 |
| WO | 03052678 A1 | 6/2003 |
| WO | 2009008857 A1 | 1/2009 |
| WO | 2015009114 A1 | 1/2015 |
| WO | 2015091425 A1 | 6/2015 |
| WO | 2015093413 A1 | 6/2015 |
| WO | 2015195814 A1 | 12/2015 |
| WO | 2019006151 A1 | 1/2019 |
| WO | 2019055267 A1 | 3/2019 |
| WO | 2021176316 A1 | 9/2021 |

OTHER PUBLICATIONS

Gregory Brower et al.; "Complaint for Patent Infringement"; Sep. 15, 2015; 15 pages.

Jeffrey A. Silverstri et al.; "Answer to Complaint for Patent Infringement"; Oct. 7, 2015; 59 pages.

United States Patent and Trademark Office; Office Action for U.S. Appl. No. 15/090,681; Aug. 26, 2016; 8 pages.

List of References for U.S. Appl. No. 15/090,681; Receipt date Jun. 30, 2016; 3 pages.

List of References for U.S. Appl. No. 15/090,681; Receipt date Apr. 27, 2016; 4 pages.

Examiner's search strategy and results for U.S. Appl. No. 15/090,681; Aug. 21, 2016; 2 pages.

*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition for Inter Partes Review); Jun. 21, 2016.

*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition for Inter Partes Review); Jun. 21, 2016.

*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition for Inter Partes Review); Jun. 21, 2016.

Exhibit 1—Invalidity Contentions re: '545 Patent Under LPR 1-8(b)-(d); at least as early as Jul. 1, 2016.

(56) References Cited

OTHER PUBLICATIONS

Exhibit 2—Invalidity Contentions re: '256 Patent Under LPR 1-8(b)-(d); at least as early as Jul. 1, 2016.
Exhibit 3—Invalidity Contentions re: '620 Patent Under LPR 1-8(b)-(d); at least as early as Jul. 1, 2016.
Exhibit 4—Invalidity Contentions re: '625 Patent Under LPR 1-8(b)-(d); at least as early as Jul. 1, 2016.
Exhibit 1002—U.S. Pat. No. 5,364,671 to Gustafson; Case IPR2016-01745; Inter Partes Review of U.S. Pat. No. 8,974,620; at least as early as Sep. 7, 2016; pp. 1-6.
Exhibit 1004—U.S. Pat. No. 7,351,470 to Draheim et al.; Case IPR2016-01745; Inter Partes Review of U.S. Pat. No. 8,974,620; at least as early as Sep. 7, 2016; pp. 1-15.
Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.
Exhibit 1003—U.S. Pat. No. 6,250,765 to Murakami; Case IPR2016-01745; Inter Partes Review of U.S. Pat. No. 8,974,620; at least as early as Sep. 7, 2016; p. 1-8.
Exhibit 1005—U.S. Pat. No. 7,957,524 to Chipping; Case IPR2016-01745; Inter Partes Review of U.S. Pat. No. 8,974,620; at least as early as Sep. 7, 2017; pp. 1-20.
Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.
Exhibit 1006—Japanese Application No. JP 2002-328613 to Kitaguchi Translation; IPR2016-01745; at least as early as Sep. 7, 2016; pp. 1-10.
Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
Aevoe Corp. v. Racing Optics, Inc.; Declaration of Darran Cairns; Case IPR2016-01745; Inter Partes Review of U.S. Pat. No. 8,974,620; at least as early as Sep. 7, 2016; pp. 1-32.
Aevoe Corp. v. Racing Optics, Inc.; Petitioner's Power of Attorney; Case IPR2016-01745; Inter Partes Review of U.S. Pat. No. 8,974,620; at least as early as Sep. 7, 2016; pp. 1-3.
Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.
Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.
Aevoe Corp. v. Racing Optics, Inc.; Mandatory Notices; Case IPR2016-01745; Inter Partes Review of U.S. Pat. No. 8,974,620; at least as early as Sep. 7, 2016; pp. 1-4.
Aevoe Corp. v. Racing Optics, Inc.;Power of Attorney; Case IPR2016-01745; Inter Partes Review of U.S. Pat. No. 8,974,620; at least as early as Sep. 7, 2016; pp. 1-4.
Aevoe Corp. v. Racing Optics, Inc.; Notice of Filing Date; Case IPR2016-01745; Inter Partes Review of U.S. Pat. No. 8,974,620; at least as early as Sep. 6, 2016; p. 1-5.
Aevoe Corp. v. Racing Optics, Inc.; Decision; Case IPR2016-01164; Inter Partes Review of U.S. Pat. No. 9,104,256; at least as early as Nov. 7, 2016; p. 1-24.
Aevoe Corp. v. Racing Optics, Inc.; Decision; Case IPR2016-01166; Inter Partes Review of U.S. Pat. No. 9,274,625; at least as early as Nov. 7, 2016; p. 1-23.
Aevoe Corp. v. Racing Optics, Inc.; Decision; Case IPR2016-01165; Inter Partes Review of U.S. Pat. No. 9,128,545; at least as early as Nov. 7, 2016; p. 1-25.
Settlement and License Agreement, Dec. 21, 2007, 28 pgs.
United States Patent and Trademark Office; Office Action dated Dec. 21, 2016 pertaining to U.S. Appl. No. 15/090,681, filed Apr. 5, 2016; 8 pages.

PCT Search Report and Written Opinion for US2020/016245 (Apr. 28, 2020).
Professional Plastics (http://www.professionalplastics.com/MelinexPETFilmDupont) 2012.
Whitney, Frank D., Preliminary Injunction, Aug. 21, 2007, 5 pgs.
Higgins, John P., Answer and Counterclaims to First Amended Complaint, Sep. 4, 2007, 27 pgs.
Ballato, John, Expert Report of John Ballato, Ph.D., Nov. 12, 2007, 5 pgs.
Russell, Geoffrey A., Rebuttal Report of Geoffrey A. Russell, Ph.D., on issues raised in the Export Report of John Ballato, Ph.D., Nov. 21, 2007, 15 pgs.
Higgins, John P., Defendants' Second Supplement to Its Response to Plaintiffs' First Set of Interrogatories, Dec. 7, 2007, 25 pgs.
Barnhardt, John J. III, Redacted Version Defendants' Memorandum in Support of Motion for Partial Summary Judgment, Dec. 3, 2007, 36 pgs.
Higgins, John P., Defendants' Second Supplement to its Response to Plaintiffs' First Set of Interrogatories, Dec. 7, 2007, 26 pgs.
Whitney, Frank D., Consent Judgment Order, Jan. 3, 2008, 5 pgs.
Ballato, John, Supplemental Expert Report of John Ballato, Ph.D., Nov. 19, 2007, 10 pgs.
Moore, Steven D., Plaintiffs' Motion to Strike Defendants' New and Untimely Invalidity Theory, Dec. 19, 2007, 3 pgs.
Moore, Steven D., Plaintiffs' Brief in Support of Motion to Strike Defendants' New and Untimely Invalidity Theory, Dec. 19, 2007, 10 pgs.
Barnhardt, John J. III, Notice Pursuant to 35 U.S.C. 282, Dec. 18, 2007, 3 pgs.
Office Action for Canadian Patent Application No. 2,952,436; Jul. 8, 2020.
www.wikipedia.org. "Black Body", Jul. 2009, 11 pages.
www.wikipedia.org. "Infrared", Jul. 2009, 12 pages.
www.wikipedia.org. "PET Film (biaxially oriented)", Jul. 2009, 4 pages.
PCT International Application No. PCT/US99/25128 with International Search Report, Date of Completion Jan. 18, 2000, 54 Pages.
English translation of TW201027992, "Monitor Protection Device for a Flat Panel Display", 11 pgs.
Pulse Racing Innovations, EZ Tear Universal Single Pull Tearoff Ramp, webpage <https://www.pulseracinginnovations.com>, Dec. 30, 2020, 6 pages.
PCT International Search Report and Written Opinion for International Application No. PCT/US20/24639, Jun. 11, 2020, 13 pages.
PCT International Search Report and Written Opinion for International Application No. PCT/US2020/049919; Nov. 27, 2020.
Tian-Chi Chang, Xun Cao, Shan-Hu Bao, Shi=Dong Ji, Hong-Jie Luo, Ping Jin; "Review on Thermochromic Vanadium Dioxide Based Smart Coatings: From Lab to Commercial Application"; Dec. 16, 2017.
PCT International Search Report and Written Opinion for International Application No. PCT/US2020/062230; Feb. 8, 2021.
"Anti-reflective coating," Wikipedia, last updated Jul. 13, 2017 by Andy Dingley, <https://en.m.wikipedia.org/wiki/Anti-reflective_coating>.
"Monotonic function," Wikipedia, accessed May 24, 2017, <https://en.wikipedia.org/wiki/Monotonic_function>.
"Thin Film," Wikipedia, last updated Jun. 20, 2017, <https://en.wikipedia.org/wiki/Thin_film>.
"Tips to Get Quality Anti-Reflection Optical Coatings," Penn Optical Coatings, accessed May 24, 2017, <http://www.pennoc.com/tipsgetqualityantireflectionopticalcoatings/>.
Langlet, M., "Antireflective Films", from Chapter 15 of Handbook of Sol-Gel Science and Technology Processing Characterization and Applications, copyright 2005, pp. 332-334, 337, 339-341., taken from website <https://books.google.com/books?id=i9swy1D2HxIC&lpg=PA339&dq=AR%20thick%20film%20coatings&pg=PA339#v=onepage&q=AR%20thick%20film%20coatings&f=false>.
Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.

(56) References Cited

OTHER PUBLICATIONS

MDS Nordion, "Gamma Compatible Materials," Datasheet, Aug. 2007, 4 pages, <https://ab-div-bdi-bl-blm.web.cern.ch/Radiation/Gamma_Compatible_Materials_List_company.pdf>, retrieved on Sep. 29, 2021.
Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/content/articlelanding/2012/m/c2jm31005h#!divAbstract>.
PCT International Search Report and Written Opinion for International Application No. PCT/US2017/044438, dated Oct. 23, 2017, 12 pages.
Chemical Book, "Benzophenone", https://www.chemicalbook.com/Chemical ProductProperty_EN_CB57 44679.htm, available at least as of 2017, accessed on line on Dec. 15, 2021 (Year: 2017).
Chemical Book, "Polymethylhydrosiloxane", https://www.chemicalbook.com/Chemical ProductProperty _EN_ CB3694969.htm, available at least as of 2017, accessed online on Dec. 15, 2021 (Year: 2017).
Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018).
Hostaphan RBB biaxially oriented film data sheet (Year: 2011).
PCT International Search Report and Written Opinion for International Application No. PCT/US2020/024639; Jun. 11, 2020.
PCT International Search Report and Written Opinion for International Application No. PCT/US2021/026165, dated Jul. 9, 2021, 10 pages.
PCT International Search Report and Written Opinion for International Application No. PCT/US21/20421, May 20, 2021, 8 pages.
Wiseman, Sr., United States Statutory Invention Registration No. H1023, published Mar. 3, 1992, 7 pages.
Chemical Book, Bis(1,2,2,6,6-pentamethyl-4-piperidyl) sebacate, available online at least as of 2017, https://www.chemicalbook.com/ChemicalProductProperty_EN_CB8121619.htm, accessed online Mar. 15, 2022 (Year: 2017).
Pearson Dental, "UV Protection Face Shields", https://www.pearsondental.com/catalog/subcat_thumb.asp?majcatid=750&catid=I0149, available online at least as of Jan. 27, 2021 per Internet Archive, accessed online on Sep. 15, 2021. (Year: 2021).
Patent Cooperation Treaty, International Search Report and Written Opinion for International Application No. PCT/US2022/031823, mailed Jul. 14, 2022, 11 pages.
Patent Cooperation Treaty, International Search Report and Written Opinion for International Application No. PCT/US2022/046171, mailed Jan. 18, 2023, 15 pages.
Patent Cooperation Treaty, International Search Report and Written Opinion for International Application No. PCT/US2023/012316, mailed Apr. 14, 2023, 11 pages.
Patent Cooperation Treaty, International Search Report and Written Opinion for International Application No. PCT/US2023/26598, mailed Sep. 12, 2023, 7 pages.
Prosecution History of U.S. Re-Examination Application No. 95/002,073 titled Touch Screen Protector; pp. 1-1,980.
www.store.moshimode.com; "iVisor AG for iPad 2 Black"; 2004-2010.
Defendant's Motion for Summary Judgment; Oct. 25, 2013; pp. 1-31.
Jake Gaecke; "Appletell Reviews the iVisor for iPad"; www.appletell.com; Sep. 15, 2010 at 12:32 p.m. www.technologytell.com/apple/60407/appletell-reviews-ag-for-ipad/; 2 pages.
www.nushield.com/technology.php; "What Makes NuShield Screen Protectors Superior", 2 pages.
www.spigen.com; "Something You Want"; 2 pages.
www.zagg.com; "Apple iPad 2 (Wi-Fi 3G) Screen Protector"; 2 pages.
www.gadgetguard.com; "Invisible Gadget Guard, the Original"; 1 page.
www.incipotech.com; "Protect Your iPhone 4 with Screen Protectors from Incipo"; 3 pages.
www.store.moshimonde.com; "iVisor AG iPad Screen Protector"; Jul. 2010; 7 pages.
www.store.moshimonde.com; "iVisor XT Crystal Clear Protector for iPad"; Aug. 2010; 3 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
Dictionary.com (http://dictionary.reference.com) 2012.
*Racing Optics, Inc.* v. *Aevoe, Inc., d/b/a/ Moshi*; Case No. 15-cv-017744-JCM-VCF; Aevoe's Initial Disclosure Non-Infringement, Invalidity and Unenforceability Contentions (Redacted) dated Jan. 7, 2016.
Defendant Aevoe Corp.'s Non-Infringement Contentions and Responses to Racing Optic's Disclosure of Asserted Claims and Infringement Contentions (U.S. Pat. No. 9,128,545) dated Jan. 7, 2016.
Defendant Aevoe Corp.'s Non-Infringement Contentions and Responses to Racing Optic's Disclosure of Asserted Claims and Infringement Contentions (U.S. Pat. No. 9,104,256) dated Jan. 7, 2016.
Defendant Aevoe Corp.'s Non-Infringement Contentions and Responses to Racing Optic's Disclosure of Asserted Claims and Infringement Contentions (U.S. Pat. No. 8,974,620) dated Jan. 7, 2016.
*I-Blason LLC* v. *Aevoe, Inc. and Aevoe Corp.*; Case IPR2016-TBA; Petition for Inter Partes Review of U.S. Pat. No. 8,044,942 (including Exhibits 1001-1019).
Dupont Teijin Films, "Mylar Polyester Film—Optical Properties", Jun. 2003, 2 pages.
https://en.wikipedia.org/wiki/Black_body, "Black Body", Jul. 2009, 11 pages.
https://en.wikipedia.org/wiki/Infrared, "Infrared", Jul. 2009, 12 pages.
https://en.wikipedia.org/wiki/BoPET, "PET Film (biaxially oriented)", Jul. 2009, 4 pages.
Instashield LLC, Bionic Wrench® Inventor Creates Low-Cost Face Shield for Masses, Apr. 15, 2020, 3 pages.
Tom Zillich, Surrey manufacturer hopes to hit home run with face shield that clips to baseball cap, Apr. 29, 2020, 3 pages.
Opentip, Opromo Safety Face Shield Visor for Adult Kids, Protective Cotton Hat with Removable PVC Face Cover <https://www.opentip.com/product.php?products_id=11699030>, May 5, 2020, 3 pages.
Hefute, Hefute 5 PCS Protective Face Cover with Shield Comfortable Full Protection Face Compatiable with Glasses Anti-Droplet Anti-Pollution and Windproof Transparent Safety Face Cover with Shield(Style B) <https://www.amazon.com/dp/B086GSG8DH/ref=sspa_dk_detail_9?psc=1&pd_rd_i=B086GSG8DH&pd_rd_w=Ocdm2&pf_rd_p=48d372c1-f7e1-4b8b-9d02-4bd86f5158c5&pd_rd_wg=qkB2b&pf_rd_r=M%E2%80%A6>, May 6, 2020, 7 pages.
Geanbaye, Geanbaye Safety Full Face Shield Cap Detachable Baseball Cap Anti-Saliva Anti-Spitting Eye Protective Hat Windproof Dustproof <https://www.amazon.com/dp/B086DV32B8/ref=sspa_dk_detail_8?psc=1&pd_rd_i=B086DV32B8&pd_rd_w=MwjfT&pf_rd_p=48d372c1-f7e1-4b8b-9d02-4bd86f5158c5&pd_rd_wg=pxuOs&pf_rd_r=PNDA%E2%80%A6>, May 5, 2020, 8 pages.
Leigh Buchanan, These 2 Companies Are Making Face Shields for Everyone <https://www.inc.com/leigh-buchanan/face-shields-coronavirus-protection-open-source.html>, May 6, 2020, 8 pages.
Brim Shield, photographs, Apr. 21, 2020, 1 pages.
Hatshield, Shield Yourself With The Hatshield <https://www.hatshield.com/?gclid=CjwKCAjwp-X0BRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.
Eli N. Perencevich, Moving Personal Protective Equipment Into the Community Face Shields and Containment of COVID-19, Apr. 29, 2020, 2 pages.

(56) References Cited

OTHER PUBLICATIONS

Chang, Tian-Ci; Cao, Xun; Bao, Shan-Hu; Ji, Shi-Dong; Luo, Hong-Jie; Jin, Ping; Review of Thermochromic Vanadium Dioxide Based Smart Coatings: From Lab to Commercial Application; Dec. 16, 2017.
Saudi Basic Industries Corporation (SABIC); "The Department of Transportation [DOT] Guidebook"; Oct. 2016.
Hostaphan RBB, "Transparent, Temperature Stable Polyester Film for Cooking & Roasting Bags'" Jul. 2016.
Hostaphan WIN, "White, Long-Term Stable, Thermally Stable Polyester Film for PV Back Sheet Laminates"; Jul. 2016.
PCT Search Report & Written Opinion for PCT/US2019/054565 (Dec. 20, 2019).
PCT Search Report & Written Opinion for PCT/US2015/036248 (Sep. 16, 2015).
"Declaration of Jerome Aho"; Filed Aug. 3, 2007; Case 3:07-cv-00221-FDW-DCK; Includes: Exhibit A, Nascar Postcard (1 page), Exhibit B, 50th Anniversary Nascar letter sent Jan. 7, 1998 (1 page), and Exhibit C, Front page of "The Official Nascar Preview and Press Guide" (1 page); 9 pages.
*Racing Optics, Inc.* v. *David Leon O'Neal, Edward M. Wallace and Clear View Racing Optics, LLC*; Case 3:07 CV 221; Includes: Exhibit A, Wilson et al. U.S. Pat. No. 6,847,492; and Exhibit B, Wilson et al. U.S. Pat. No. 7,184,217; 34 pages.
International Search Report; International Application No. PCT/US99/95128; Date of Completion: Jan. 18, 2000; 54 pages.
International Search Report; International Application No. PCT/US02/10971; Date of Completion: Nov. 20, 2002; 3 pages.
International Search Report; International Application No. PCT/US03/16284; Date of Completion: Mar. 9, 2004; 3 pages.
European Search Report for Application No. 15809930.9-107 / 3157480 (Dec. 15, 2017).
Canadian Office Action for Application Serial No. 2,952,436 (Nov. 15, 2019).
Canadian Office Action for Application Serial No. 2,952,436 (May 3, 2019).
Australian Examination Report for Application Serial No. 2015277196 (Oct. 18, 2018).
www.wikipedia.org, Refractive Index, Oct. 31, 2014.

STACK OF STERILE PEELABLE LENSES WITH LOW CREEP

CROSS-REFERENCE TO RELATED APPLICATIONS

This application is a continuation of U.S. application Ser. No. 17/823,413, filed Aug. 30, 2022, which relates to and claims the benefit of U.S. Provisional Application No. 63/365,909, filed Jun. 6, 2022 and entitled "Stack of Sterile Peelable Lenses with Low Creep," the entire contents of which is expressly incorporated by reference herein.

STATEMENT RE: FEDERALLY SPONSORED RESEARCH/DEVELOPMENT

Not Applicable

BACKGROUND

Laminated, peelable, low peel strength (e.g., 30-80 gram-in) optical lens stacks may be employed in various contexts, such as in connection with protective eyewear or vehicle windshields. The low peel strength allows each lens to be removed from the stack one at a time. (As the peel strength increases above 600 gram-in, for example, the bond may be considered permanent.) As each lens is added to produce the stack, the heating and ultraviolet exposure that is used to cure each successive layer of adhesive may affect the already-cured adhesive layers as well. For instance, in a four-layer stack, the first layer may effectively be exposed to curing processes three or more times while the last layer is only exposed once. This can lead to under-cured layers which can lead to peel creep (i.e., increase in peel strength) over time and at normal storage temperatures (e.g., 59° F. to 86° F.).

BRIEF SUMMARY

The present disclosure contemplates various methods for overcoming the above drawbacks accompanying the related art. One aspect of the embodiments of the disclosure is a method of manufacturing a stack of peelable lenses. The method may comprise coating a first lens with a first adhesive coating (e.g., comprising at least 30% solvent), heating the first adhesive coating to evaporate at least some solvent of the first adhesive coating and to initiate curing of the first adhesive coating, and, after the heating of the first adhesive coating, exposing the first adhesive coating to ultraviolet light to continue curing of the first adhesive coating. The method may further comprise, after the exposing of the first adhesive coating to ultraviolet light, laminating a second lens onto a surface of the first adhesive coating to produce a stack of lenses. The method may further comprise coating the second lens with a second adhesive coating (e.g., comprising at least 30% solvent), heating the second adhesive coating to evaporate at least some solvent of the second adhesive coating and to initiate curing of the second adhesive coating, and, after the heating of the second adhesive coating, exposing the second adhesive coating to ultraviolet light to continue curing of the second adhesive coating. The method may further comprise, after the exposing of the second adhesive coating to ultraviolet light, laminating a third lens onto a surface of the second adhesive coating to add the third lens to the stack of lenses. The method may further comprise, after the laminating of the third lens onto the surface of the second adhesive coating, exposing the stack of lenses to an electron beam to continue curing of the first adhesive coating and the second adhesive coating.

The exposing of the stack of lenses to the electron beam may be performed while the stack of lenses is on roll-to-roll processing equipment. A temperature of the heating of the second adhesive coating may be greater than a temperature of the heating of the first adhesive coating. An exposure time of the exposing of the second adhesive coating to ultraviolet light may be greater than an exposure time of the exposing of the first adhesive coating to ultraviolet light. After the heating of the second adhesive coating, a thickness of the first adhesive coating may be 20 microns or less and a thickness of the second adhesive coating may be 20 microns or less. After the heating of the second adhesive coating, a thickness variation of the first adhesive coating may be less than 0.5 microns in a 12-millimeter period and a thickness variation of the second adhesive coating may be less than 0.5 microns in a 12-millimeter period. Each of the first, second, and third lenses may comprise polyethylene terephthalate (PET). Each of the first and second adhesive coatings may comprise an optically clear adhesive (OCA). Each of the first and second adhesive coatings may comprise an acrylate.

The method may comprise additional steps after the laminating of the third lens onto the surface of the second adhesive coating and prior to the exposing of the stack of lenses to the electron beam. The additional steps may comprise coating the third lens with a third adhesive coating (e.g., comprising at least 30% solvent), heating the third adhesive coating to evaporate at least some solvent of the third adhesive coating and to initiate curing of the third adhesive coating, and after the heating of the third adhesive coating, exposing the third adhesive coating to ultraviolet light to continue curing of the third adhesive coating. The additional steps may further comprise, after the exposing of the third adhesive coating to ultraviolet light, laminating a fourth lens onto a surface of the third adhesive coating to add the fourth lens to the stack of lenses. The exposing of the stack of lenses to the electron beam may further be to continue curing of the third adhesive coating.

In some cases, the third and fourth lenses may already be adhered together before the third lens is laminated onto the surface of the second adhesive. That is, two stacks of two (or more) lenses may be combined together. In this regard, another aspect of the embodiments of the present disclosure is a method of manufacturing a stack of peelable lenses in which the method may include coating a first lens with a first adhesive coating (e.g., comprising at least 30% solvent), heating the first adhesive coating to evaporate at least some solvent of the first adhesive coating and to initiate curing of the first adhesive coating, and, after the heating of the first adhesive coating, exposing the first adhesive coating to ultraviolet light to continue curing of the first adhesive coating. The method may further comprise, after the exposing of the first adhesive coating to ultraviolet light, laminating a second lens onto a surface of the first adhesive coating to produce a first stack of lenses. The method may further comprise coating a third lens with a third adhesive coating (e.g., comprising at least 30% solvent), heating the third adhesive coating to evaporate at least some solvent of the third adhesive coating and to initiate curing of the third adhesive coating, and, after the heating of the third adhesive coating, exposing the third adhesive coating to ultraviolet light to continue curing of the third adhesive coating. The method may further comprise, after the exposing of the third adhesive coating to ultraviolet light, laminating a fourth lens onto a surface of the third adhesive coating to produce a second stack of lenses. The method may further comprise coating the second lens with a second adhesive coating (e.g., comprising at least 30% solvent), heating the second adhesive coating to evaporate at least some solvent of the second adhesive coating and to initiate curing of the second adhesive coating, and, after the heating of the second adhesive coating, exposing the second adhesive coating to ultraviolet light to continue curing of the second adhesive coating. The method may further comprise, after the exposing of the second adhesive coating to ultraviolet light, laminating the second stack of lenses onto a surface of the second adhesive coating to produce a combined stack of lenses from the first and second stacks of lenses. The method may further comprise exposing the combined stack of lenses to an electron beam to continue curing of the first adhesive coating, the second adhesive coating, and the third adhesive coating.

The exposing of the combined stack of lenses to the electron beam may be performed while the combined stack of lenses is on roll-to-roll processing equipment. A temperature of the heating of the second adhesive coating may be greater than a temperature of the heating of the first adhesive coating (e.g., by 20%). An exposure time of the exposing of the second adhesive coating to ultraviolet light may be greater than an exposure time of the exposing of the first adhesive coating to ultraviolet light (e.g., by 50%). After the heating of the second adhesive coating, a thickness of the first adhesive coating may be 20 microns or less and a thickness of the second adhesive coating may be 20 microns or less. After the heating of the second adhesive coating, a thickness variation of the first adhesive coating may be less than 0.5 microns in a 12-millimeter period and a thickness variation of the second adhesive coating may be less than 0.5 microns in a 12-millimeter period, resulting in reduced optical distortion. Each of the first, second, third, and fourth lenses may comprise polyethylene terephthalate (PET). Each of the first, second, and third adhesive coatings may comprise an optically clear adhesive (OCA). Each of the first, second, and third adhesive coatings may comprise an acrylate.

More generally in regard to combining stacks of two or more lenses together, another aspect of the embodiments of the present disclosure may include a method of manufacturing a stack of peelable lenses in which the method comprises producing first and second stacks of lenses. The producing of the first stack may include providing a lens and performing the following sequence of steps one or more times, with the lens initially defining an outermost lens of the first stack: coating the outermost lens of the first stack with an adhesive coating (e.g., comprising at least 30% solvent), heating the adhesive coating to evaporate at least some solvent of the adhesive coating and to initiate curing of the adhesive coating, exposing the adhesive coating to ultraviolet light to continue curing of the adhesive coating, and laminating an additional lens onto a surface of the adhesive coating, the additional lens redefining the outermost lens of the first stack. Similarly, the producing of the second stack may include providing a lens and performing the following sequence of steps one or more times, with the lens initially defining an outermost lens of the second stack: coating the outermost lens of the second stack with an adhesive coating (e.g., comprising at least 30% solvent), heating the adhesive coating to evaporate at least some solvent of the adhesive coating and to initiate curing of the adhesive coating, exposing the adhesive coating to ultraviolet light to continue curing of the adhesive coating, and laminating an additional lens onto a surface of the adhesive coating, the additional lens redefining the outermost lens of the second stack. The method may further comprise coating the outermost lens of the first stack with an adhesive coating (e.g., comprising at least 30% solvent), heating the adhesive coating that is coated on the outermost lens of the first stack to evaporate at least some solvent of the adhesive coating and to initiate curing of the adhesive coating, and, after the heating of the adhesive coating that is coated on the outermost lens of the first stack, exposing the adhesive coating to ultraviolet light to continue curing of the adhesive coating. The method may further comprise, after the exposing of the adhesive coating that is coated on the outermost lens of the first stack, laminating the second stack of lenses onto a surface of the adhesive coating to combine the first and second stacks into a combined stack of lenses. The method may further comprise exposing the combined stack of lenses to an electron beam to continue curing of the adhesive coatings contained within the combined stack of lenses.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of methods of manufacturing a stack of peelable lenses, in particular, a stack that may exhibit low peel creep. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figure 1:
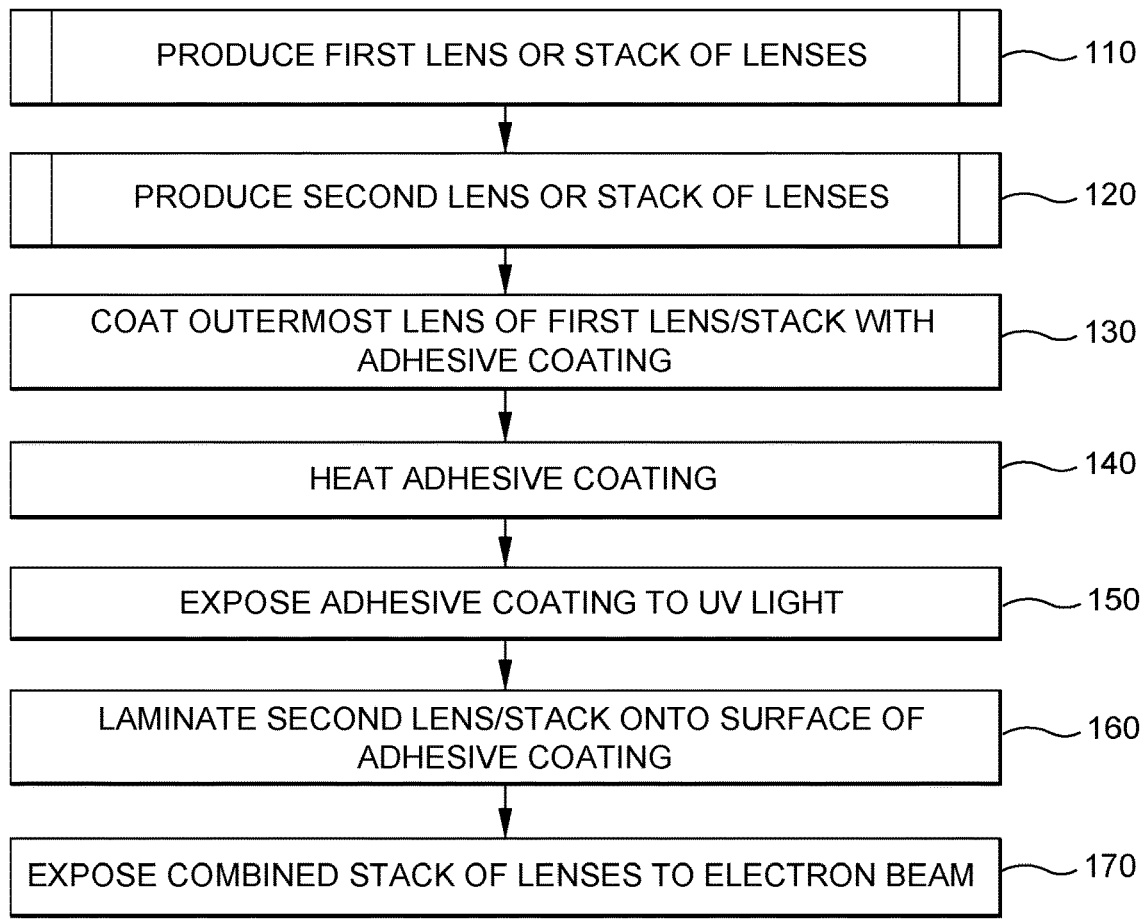
FIG. 1 is an example operational flow for manufacturing a stack of peelable lenses according to an embodiment of the present disclosure.

FIG. 1 is an example operational flow for manufacturing a stack of peelable lenses according to an embodiment of the present disclosure. Unlike conventional processes, the operational flow of FIG. 1 includes a final step of exposing the stack of lenses to an electron beam in order to force crosslinking to occur and complete the curing processes in all of the layers of the stack. As a result, under-curing may be avoided and peel creep may be greatly reduced. Advantageously, the electron beam exposure may simultaneously provide sterilization of any micro-organisms trapped between the laminated layers of the stack, making later radiation sterilization unnecessary.

The stack of peelable lenses may serve as or be affixed to protective eyewear such as goggles, glasses, or facemasks for off-road vehicle use or surgical and other medical procedures. Display screens of mobile phones, personal computers, ATMs and vending terminals, etc. may likewise employ stacks of peelable lenses to prevent damage to the underlying screen or block side viewing (e.g., for privacy and security in public places). In other cases, the stack of peelable lenses may serve as or be affixed to a larger size window of building or a vehicle windshield for tinting (e.g., for privacy), for thermal insulation, to block ultraviolet (UV) radiation, or for decoration. In any such setting, as the outermost lens of the stack becomes dirty and obstructs the wearer's or operator's vision, it may be peeled away to reveal the next pristine lens underneath. Examples of stacks of peelable lenses that may be manufactured as described herein, as well as methods of manufacturing and installation that may be used together with the processes described herein, may include those described in U.S. Pat. No. 8,361,260, entitled "Automobiles having a Radiant Barrier," U.S. Pat. Nos. 9,128,545, 9,274,625, and 10,620,670, all entitled "Touch Screen Shield," U.S. Pat. No. 9,295,297, entitled "Adhesive Mountable Stack of Removable Layers," U.S. Patent Application Pub. No. 2020/0124768, entitled "Transparent Covering Having Anti-Reflective Coatings," U.S. Patent Application Pub. No. 2020/0247102, entitled "Thermoform Windshield Stack with Integrated Formable Mold," U.S. Pat. No. 11,364,715, entitled "Polymer Safety Glazing for Vehicles," U.S. Patent Application Pub. No. 2021/0070017, entitled "Nano Particle Solar Control Film," U.S. Patent Application Pub. Nos. 2021/0162645 and 2022/0032591, both entitled "Method and Apparatus for Reducing Non-Normal Incidence Distortion in Glazing Films," U.S. Patent Application Pub. No. 2021/0283994, entitled "Protective Barrier for Safety Glazing," U.S. Patent Application Pub. No. 2022/0040956, entitled "Protective Barrier for Surfaces," U.S. patent application Ser. No. 17/210,241, entitled "Tearoff Tab Tensioner," U.S. patent application Ser. No. 17/342,373, entitled "Low Haze UV Blocking Removable Lens Stack," U.S. Pat. No. 11,307,329, entitled "Low Reflectance Removable Lens Stack," and U.S. Pat. No. 10,427,385, entitled "Low Reflectance Optical Web," the entire contents of each of which is incorporated by reference herein.

The operational flow of FIG. 1 may begin with producing first and second lenses or stacks of lenses (steps 110, 120). In the simplest case of manufacturing only a two-layer stack, steps 110 and 120 may each only produce a single lens, for example, which may thereafter be combined according to steps 130-170. In the case of manufacturing a stack of three or more lenses, one or both of steps 110 and 120 may itself produce a stack of lenses (which will be a sub-stack of the final stack of lenses produced by steps 130-170).

By way of illustration, a stack of three lenses may be manufactured according to the operational flow of FIG. 1 as follows. The operational flow may begin with producing a first stack of two lenses (step 110). For example, referring to the sub-operational flow of FIG. 2, step 110 may begin with providing a first lens (step 210), such as a polyethylene terephthalate (PET) lens or other optically clear substrate, which may be provided as a roll-to-roll processing web. The first lens may be 25-400 microns thick, for example. The first lens may be coated with a first adhesive coating (step 220) comprising a laminating adhesive such as an optically clear adhesive (OCA), which may be in the family of pressure sensitive adhesives (PSAs). To meet criteria for high transmission, low haze, and low distortion, a very thin coating of the laminating adhesive on the order of 10-20 microns (or even 5-20 microns) may be preferred, especially given that optical error such as haze and distortion is additive with each layer added to the stack. To this end, the adhesive coating may comprise a high content of solvent to solids such as at least 30% solvent. In order to produce a thin PSA, for example, 30%-60% solvents may be mixed into acrylates to reduce the viscosity of the liquid and may be deposited onto the first lens via gravure, rods, or slot dies in a roll-to-roll process. The surface of the first lens may be nano-roughened to promote a high peel strength of the PSA so that when the first lens is peeled away from the next laminated lens the PSA stays permanently affixed to the first lens surface.

Figure 2:
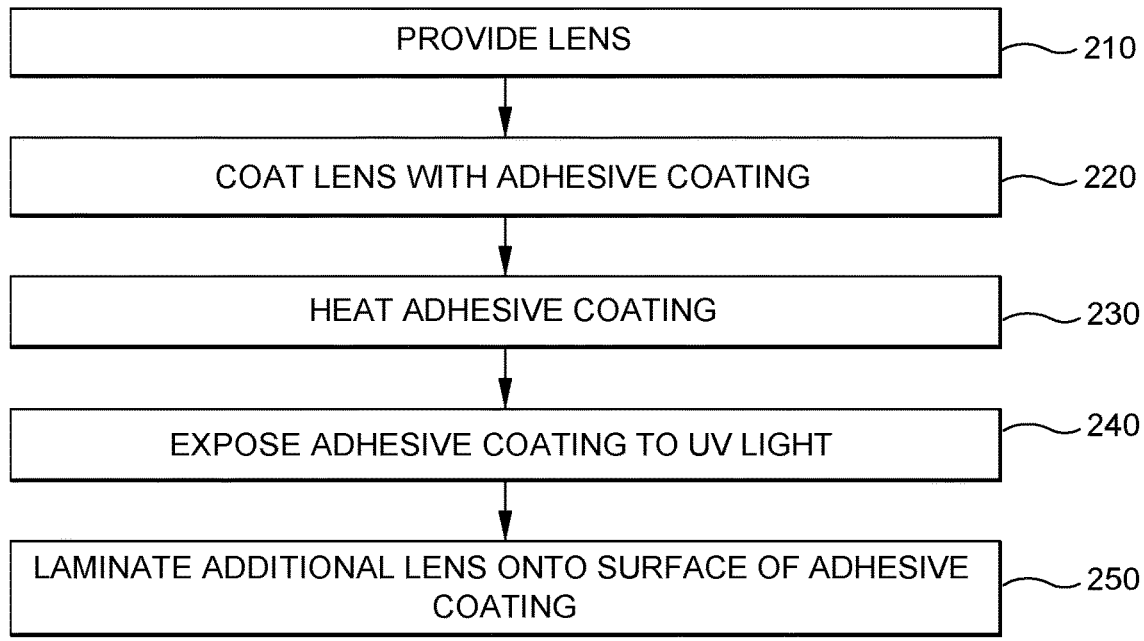
FIG. 2 is an example sub-operational flow that may represent sub-steps of either or both of steps 110 and 120 in FIG. 1.

The coated first lens may then pass through several curing stages. For example, as shown in FIG. 2, the adhesive coating may first be heated (e.g., by one or more ovens at 150-220° F.) to evaporate at least some of the solvent (step 230). This may reduce the thickness by 40%-70% and may allow the coating to level out to have a consistent thickness, minimizing optical distortion. After heating (or after a later heating step, as the effects may be cumulative), the thickness of the adhesive coating may be 20 microns or less (e.g., 5-20 microns) and the thickness variation may be less than 0.5 microns in a 12-millimeter period across the web, for example. The heating may also initiate curing of the first adhesive coating as some crosslinking may begin to occur at this point. Next, the adhesive coating may be exposed to ultraviolet (UV) light (e.g., 0.1-1.0 $Mj/m^2$) to continue curing of the adhesive coating (step 240), for example, by starting photoinitiation of the crosslinking process.

With the first adhesive coating in this partially cured state, the operational flow may continue with laminating an additional lens onto the surface of the partially cured adhesive coating (step 250), for example, by a nipping roller. At this stage, the subprocess of FIG. 2 has produced a stack of two lenses, which will serve as the first stack of lenses produced by step 110 of FIG. 1.

The operational flow of FIG. 1 may then continue with producing a second lens or stack (step 120), which may be simply a single lens in the case of manufacturing a three-layer stack. In this regard, the operational flow of FIG. 2 may begin again, this time as a subprocess of step 120. Since only one lens will be produced in this step, the lens may simply be provided in step 210, with steps 220-250 omitted. Thus, in the relatively simple example of a three-layer stack, a two-layer stack may be produced by step 110 while a single lens is produced by step 120. The operational flow of FIG. 1 may then proceed with coating the outermost lens of the first stack (produced by step 110) with an adhesive coating (step 130). In this case, the outermost lens of the first stack may be the additional lens that was laminated onto the first lens in step 250 during the sub-operational flow of step 110. The adhesive coating (second adhesive coating) may be the same as described above and may likewise be heated (step 140) and exposed to UV light (step 150). The single lens produced by step 120 may then be laminated onto the surface of the partially cured second adhesive coating to add a third lens to the stack of lenses (step 160), for example, by a nipping roller.

Unlike conventional processes of manufacturing stacks of peelable lenses, the operational flow of FIG. 1 may conclude with exposing the entire combined stack of lenses to an electron beam to continue curing of the adhesive coatings contained within (step 170), namely, the first and second adhesive coatings in the example of a three-layer stack. The electron beam exposure may preferably be performed while the stack of lenses is still on roll-to-roll processing equipment that was used to assemble it. Advantageously, the electron beam exposure may complete the curing function equally in all layers of the stack. Since the stack is relatively thin (e.g., 10-25 mils) the electron beam exposure may be very uniform from top to bottom of the stack. If UV absorbing compounds are present in the adhesive coating (e.g., to improve weatherability) the electron beam may still provide a uniform exposure, unlike what is found to be the case with UV exposure processes in the presence of UV absorbing compounds.

It can be appreciated that the processing time for each adhesive layer may be different as each added layer undergoes fewer heating and UV processes than those before it. As described above, the electron beam curing may help to even out the curing between the layers by completing the curing function in the entire stack. It is also contemplated that the uniformity of curing may be further enhanced by varying the curing processes throughout the operational flow of FIG. 1. For example, temperatures of later heating processes (e.g., step 140) may be greater than temperatures of earlier heating processes (e.g., step 230). That is, using the above three-layer stack as an example, the temperature of the heating of the second adhesive coating may be greater than the temperature of heating the first adhesive coating. Instead, or additionally, exposure times of later UV exposure processes (e.g., step 150) may be greater than exposure times of earlier UV exposure processes (e.g., step 240). For example, continuing with the above three-layer example, the exposure time of exposing the second adhesive coating to UV light may be greater than the exposure time of exposing the first adhesive coating to UV light. In this way, the greater temperature and/or longer UV exposure experienced by later adhesive coatings can help the later adhesive coatings "catch up" with the curing of the earlier adhesive coatings that have already undergone some heating and/or UV exposure. By modifying the thermal and UV curing at each layer, a more uniform partial curing can be achieved before the entire stack is exposed to the final curing of the electron beam (step 170) in order to more precisely meet the target peel strength at each layer of the stack.

Along the same lines, it should be noted, in general, that the thermal and UV cure times and other parameters may be selected in consideration of the later electron beam curing. In particular, the thermal and UV curing may be less than in conventional manufacturing processes in order that the electron beam curing does not over-cure the stack and increase the peel strength too much. In general, the electron beam curing may adjust the peel strength of the adhesive coatings toward a target peel strength, with the prior thermal and UV curing thus being aimed only to begin the curing process but not to reach the target peel strength.

As a further outcome of exposing the stack of lenses to the electron beam while it is still in the roll-to-roll processing, the electron beam exposure may also provide sterilization of any microorganisms trapped between the laminated layers of the stack, thus ensuring a sterile lens stack. This greatly increases the efficiency of the manufacturing process as compared to first cutting desired shapes out of the rolls (e.g., eyewear lens shapes) and then shipping them to a lab for gamma sterilization of the interlayers, for example. In this regard, it should be noted that electron beam exposure would typically not be used for this kind of downstream sterilization because it would be unknown if the peel strength might be affected by further crosslinking of the adhesive.

In the above example, a stack of three lenses was manufactured according to the operational flow of FIG. 1, with step 110 producing a sub-stack of two lenses (by performing steps 210-250) and step 120 producing a single lens (by performing only step 210). If a stack of four lenses, five lenses, or more is desired, the operational flow of FIG. 1 may be performed in essentially the same way but with steps 220-250 repeated as desired during step 110, with each new adhesive coating being successively applied to each additional lens. So, for example, a stack of four lenses may be manufactured according to the operational flow of FIG. 1 as follows. First a stack of three lenses may be produced (step 110), referring to the sub-operational flow of FIG. 2, by providing a first lens (step 210), coating the first lens with a first adhesive coating (step 220), heating the first adhesive coating to evaporate at least some of the solvent (step 230), exposing the first adhesive coating to UV light to continue curing of the first adhesive coating (step 240), laminating a second lens onto the surface of the first adhesive coating (step 250), coating the second lens with a second adhesive coating (step 220 again), heating the second adhesive coating to evaporate at least some of the solvent (step 230 again), exposing the second adhesive coating to UV light to continue curing of the second adhesive coating (step 240 again), and laminating a third lens onto the surface of the first adhesive coating (step 250 again). The operational flow of FIG. 1 may then continue with producing a single lens as described above (step 120, consisting only of the subprocess of step 210), followed by coating the outermost lens of the first stack (produced by step 110) with a third adhesive coating (step 130), heating and exposing the third adhesive coating to UV light (steps 140 and 150), laminating the single lens produced by step 120 onto the surface of the partially cured third adhesive coating to add a fourth lens to the stack of lenses (step 160), and, finally, exposing the combined stack of lenses to an electron beam (step 170). Larger stacks can be produced simply by repeating steps 220-250 additional times during step 110.

The stack of lenses may also be manufactured by combining two sub-stacks of two or more lenses each (e.g., a two-by-two stack, a two-by-three stack, etc.). To illustrate this, another way of manufacturing a stack of four lenses according to the operational flow of FIG. 1 is as follows. First a stack of two lenses may be produced (step 110), referring to the sub-operational flow of FIG. 2, by performing steps 210-250 one time through without repeating steps 220-250. Then, a second stack of two lenses may be produced (step 120) in exactly the same way, that is, by performing steps 210-250 one time through without repeating steps 220-250. The operational flow of FIG. 1 may then continue with coating the outermost lens of the first sub-stack of two lenses (produced by step 110) with an adhesive coating (step 130), heating and exposing the adhesive coating to UV light (steps 140 and 150), laminating the second sub-stack of two lenses (produced by step 120) onto the surface of the partially cured adhesive coating to combine the two sub-stacks into a stack of four lenses (step 160), and, finally, exposing the combined stack of lenses to an electron beam (step 170). Larger stacks of this type can be produced simply by repeating steps 220-250 additional times during either or both of steps 110 and 120.

In a case where one or both of steps 110 and 120 involve the repetition of steps 220-250 of FIG. 2, each successive repetition of the heating and UV exposure processes (steps 230 and 240) may have different parameters in order to achieve a more even partial curing as described above. Thus, for example, an earlier repetition of step 230 may be at a lower temperature, a later repetition of step 230 may be at a higher temperature, and the final heating in step 140 may be at the highest temperature. Similarly, an earlier repetition of step 240 may have a shorter UV exposure time, a later repetition of step 240 may have a longer UV exposure time, and the final UV exposure in step 150 may have the longest UV exposure time. In this way, a more uniform partial curing can be achieved before the entire stack is exposed to the final curing of the electron beam (step 170) in order to more precisely meet the target peel strength at each layer of the stack.

It should be noted that, in general, any of the above processes and sub-process may be repeated until the desired number of lenses are laminated into a peelable stack. In some cases, sub-stacks may be combined to form stacks that are themselves sub-stacks to be combined into larger stacks. For example, one possible process may be to combine two stacks of two lenses each and then to combine the resulting stack of four lenses with another stack of four lenses to produce a stack of eight lenses. The resulting combined stack may then be exposed to the electron beam (step 170) in order to complete the curing process in all adhesive coatings contained within.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing a stack of peelable lenses, the method comprising:
   coating a first lens with a first adhesive coating;
   heating the first adhesive coating to evaporate at least some solvent of the first adhesive coating and to initiate curing of the first adhesive coating;
   after said heating the first adhesive coating, exposing the first adhesive coating to ultraviolet light to continue curing of the first adhesive coating;
   after said exposing the first adhesive coating to ultraviolet light, laminating a second lens onto a surface of the first adhesive coating to produce a stack of lenses;
   coating the second lens with a second adhesive coating;
   heating the second adhesive coating to evaporate at least some solvent of the second adhesive coating and to initiate curing of the second adhesive coating;
   after said heating the second adhesive coating, exposing the second adhesive coating to ultraviolet light to continue curing of the second adhesive coating, wherein parameters of the heating and the exposing of the first and second adhesive coatings are selected such that the first and second adhesive coatings are only partially cured to result in respective peel strengths that are less than respective target peel strengths;
   after said exposing the second adhesive coating to ultraviolet light, laminating a third lens onto a surface of the second adhesive coating to add the third lens to the stack of lenses; and,
   after said laminating the third lens onto the surface of the second adhesive coating, exposing the stack of lenses to an electron beam to sterilize the stack of lenses and to continue curing of the first adhesive coating and the second adhesive coating.

2. The method of claim 1, wherein said exposing the stack of lenses to the electron beam is performed while the stack of lenses is on roll-to-roll processing equipment.

3. The method of claim 1, wherein a temperature of said heating the second adhesive coating is greater than a temperature of said heating the first adhesive coating.

4. The method of claim 1, wherein an exposure time of said exposing the second adhesive coating to ultraviolet light is greater than an exposure time of said exposing the first adhesive coating to ultraviolet light.

5. The method of claim 1, wherein, after said heating the second adhesive coating, a thickness of the first adhesive coating is 20 microns or less and a thickness of the second adhesive coating is 20 microns or less.

6. The method of claim 1, wherein, after said heating the second adhesive coating, a thickness variation of the first adhesive coating is less than 0.5 microns in a 12-millimeter period and a thickness variation of the second adhesive coating is less than 0.5 microns in a 12-millimeter period.

7. The method of claim 1, wherein each of the first, second, and third lenses comprises polyethylene terephthalate (PET).

8. The method of claim 1, wherein each of the first and second adhesive coatings comprises an optically clear adhesive (OCA).

9. The method of claim 1, wherein each of the first and second adhesive coatings comprises an acrylate.

10. The method of claim 1, further comprising, after said laminating the third lens onto the surface of the second adhesive coating and prior to said exposing the stack of lenses to the electron beam:
    coating the third lens with a third adhesive coating;
    heating the third adhesive coating to evaporate at least some solvent of the third adhesive coating and to initiate curing of the third adhesive coating;
    after said heating the third adhesive coating, exposing the third adhesive coating to ultraviolet light to continue curing of the third adhesive coating; and,
    after said exposing the third adhesive coating to ultraviolet light, laminating a fourth lens onto a surface of the third adhesive coating to add the fourth lens to the stack of lenses,
    wherein said exposing the stack of lenses to the electron beam is further to continue curing of the third adhesive coating.

11. A method of manufacturing a stack of peelable lenses to have a target peel strength, the method comprising:
    coating a first lens with a first adhesive coating;
    heating the first adhesive coating to evaporate at least some solvent of the first adhesive coating and to initiate curing of the first adhesive coating;
    after said heating the first adhesive coating, exposing the first adhesive coating to ultraviolet light to continue curing of the first adhesive coating;
    after said exposing the first adhesive coating to ultraviolet light, laminating a second lens onto a surface of the first adhesive coating to produce a first stack of lenses;
    coating a third lens with a third adhesive coating;
    heating the third adhesive coating to evaporate at least some solvent of the third adhesive coating and to initiate curing of the third adhesive coating;
    after said heating the third adhesive coating, exposing the third adhesive coating to ultraviolet light to continue curing of the third adhesive coating;
    after said exposing the third adhesive coating to ultraviolet light, laminating a fourth lens onto a surface of the third adhesive coating to produce a second stack of lenses;
    coating the second lens with a second adhesive coating;
    heating the second adhesive coating to evaporate at least some solvent of the second adhesive coating and to initiate curing of the second adhesive coating;
    after said heating the second adhesive coating, exposing the second adhesive coating to ultraviolet light to continue curing of the second adhesive coating, wherein parameters of the heating and the exposing of the first, second, and third adhesive coatings are selected such that the first, second, and third adhesive coatings are only partially cured to result in respective peel strengths that are less than respective target peel strengths;

after said exposing the second adhesive coating to ultraviolet light, laminating the second stack of lenses onto a surface of the second adhesive coating to produce a combined stack of lenses from the first and second stacks of lenses; and exposing the combined stack of lenses to an electron beam to sterilize the combined stack of lenses and to continue curing of the first adhesive coating, the second adhesive coating, and the third adhesive coating.

12. The method of claim 11, wherein said exposing the combined stack of lenses to the electron beam is performed while the combined stack of lenses is on roll-to-roll processing equipment.

13. The method of claim 11, wherein a temperature of said heating the second adhesive coating is greater than a temperature of said heating the first adhesive coating.

14. The method of claim 11, wherein an exposure time of said exposing the second adhesive coating to ultraviolet light is greater than an exposure time of said exposing the first adhesive coating to ultraviolet light.

15. The method of claim 11, wherein, after said heating the second adhesive coating, a thickness of the first adhesive coating is 20 microns or less and a thickness of the second adhesive coating is 20 microns or less.

16. The method of claim 11, wherein, after said heating the second adhesive coating, a thickness variation of the first adhesive coating is less than 0.5 microns in a 12-millimeter period and a thickness variation of the second adhesive coating is less than 0.5 microns in a 12-millimeter period.

17. The method of claim 11, wherein each of the first, second, third, and fourth lenses comprises polyethylene terephthalate (PET).

18. The method of claim 11, wherein each of the first, second, and third adhesive coatings comprises an optically clear adhesive (OCA).

19. The method of claim 11, wherein each of the first, second, and third adhesive coatings comprises an acrylate.

20. A method of manufacturing a stack of peelable lenses, the method comprising:
producing a first stack of lenses, said producing the first stack including:
providing a lens, the lens initially defining an outermost lens of the first stack; and
performing the following sequence of steps one or more times:
coating the outermost lens of the first stack with an adhesive coating;
heating the adhesive coating to evaporate at least some solvent of the adhesive coating and to initiate curing of the adhesive coating;
exposing the adhesive coating to ultraviolet light to continue curing of the adhesive coating; and
laminating an additional lens onto a surface of the adhesive coating, the additional lens redefining the outermost lens of the first stack;
producing a second stack of lenses, said producing the second stack including:
providing a lens, the lens initially defining an outermost lens of the second stack; and
performing the following sequence of steps one or more times:
coating the outermost lens of the second stack with an adhesive coating;
heating the adhesive coating to evaporate at least some solvent of the adhesive coating and to initiate curing of the adhesive coating;
exposing the adhesive coating to ultraviolet light to continue curing of the adhesive coating; and
laminating an additional lens onto a surface of the adhesive coating, the additional lens redefining the outermost lens of the second stack;
coating the outermost lens of the first stack with an adhesive coating;
heating the adhesive coating that is coated on the outermost lens of the first stack to evaporate at least some solvent of the adhesive coating and to initiate curing of the adhesive coating;
after said heating the adhesive coating that is coated on the outermost lens of the first stack, exposing the adhesive coating to ultraviolet light to continue curing of the adhesive coating, wherein parameters of the heating and the exposing of the adhesive coatings are selected such that the adhesive coatings are only partially cured to result in respective peel strengths that are less than respective target peel strengths;
after said exposing the adhesive coating that is coated on the outermost lens of the first stack, laminating the second stack of lenses onto a surface of the adhesive coating to combine the first and second stacks into a combined stack of lenses; and
exposing the combined stack of lenses to an electron beam to sterilize the combined stack of lenses and to continue curing of the adhesive coatings contained within the combined stack of lenses.

21. A method of manufacturing a stack of peelable lenses to have a target peel strength, the method comprising:
providing a stack of lenses with adhesive coatings disposed between each pair of adjacent lenses of the stack, wherein the adhesive coatings are only partially cured to result in respective peel strengths that are less than respective target peel strengths; and
exposing the stack of lenses to an electron beam to simultaneously adjust the respective peel strengths of the adhesive coatings toward the respective target peel strength and sterilize the stack of lenses.

* * * * *